United States Patent [19]
McKissic

[11] 3,879,101
[45] Apr. 22, 1975

[54] ELECTRIC PLUG-IN MODULE

[76] Inventor: George T. McKissic, 424 New St., Spring City, Pa. 19475

[22] Filed: Dec. 4, 1973

[21] Appl. No.: 421,587

[52] U.S. Cl. ............................................. 339/122 R
[51] Int. Cl. ........................................... H01r 13/60
[58] Field of Search ................................ 339/122 R

[56] References Cited
UNITED STATES PATENTS

| | | | |
|---|---|---|---|
| 1,938,309 | 12/1933 | Williams | 339/122 R |
| 2,828,394 | 3/1958 | Mayzik | 339/122 R |
| 2,908,743 | 10/1959 | Premoshis | 339/122 R |
| 3,609,647 | 9/1971 | Castellano | 339/122 R |

*Primary Examiner*—Roy Lake
*Assistant Examiner*—E. F. Desmond

[57] ABSTRACT

A receptacle adapted for permanent mounting in a permanently mounted conventional electrical box mounted in a wall or other suitable supporting surface with the receptacle mounted inwardly of the box compartment, and an interchangable module in the form of an electric switch adapted to fit snugly in the box compartment and having a plurality of plugs projecting out of the back thereof adapted to be oriented and engaged in the respective sockets of the receptacle when the module is inserted into the box compartment in a manner to effect the electrical energization of the module, the module being readily replacable for repair or maintenance by merely unplugging the module by pulling it out of the receptacle and box compartment and then inserting a new module to take its place such that no wires or electrical connections are exposed during the interchange or installation of the module thus protecting an individual from possible electrical shock.

1 Claim, 6 Drawing Figures

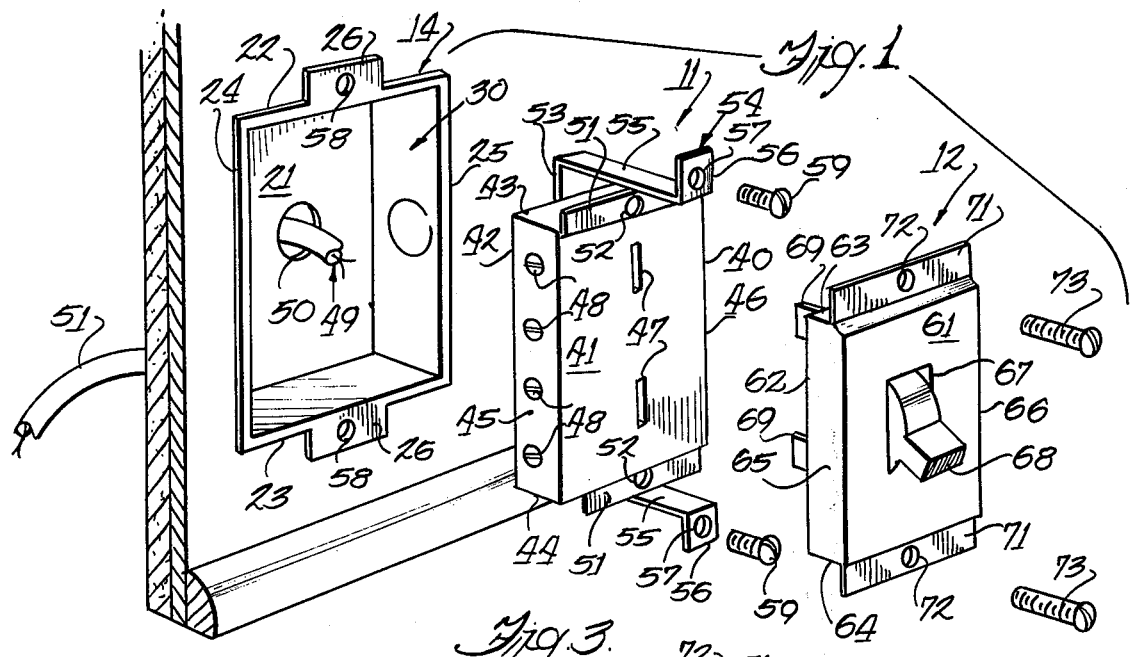

ELECTRIC PLUG-IN MODULE

BACKGROUND OF THE INVENTION

1. Field of the Invention

This invention relates generally to electrical wiring components and more particularly to a novel and improved electrical receptacle adapted to have an electrical switch plugged thereinto for electrical energization thereof without requiring any special tools or exposing any electrical wires or parts for possible contact by an individual to obtain an electrical shock therefrom when interchanging the electrical switch module.

2. Description of the Prior Art

It is presently known to wire a house, building or the like for electrical wiring by providing conventional type electrical boxes where the electrical receptacles and switches are to be located, and then interconnecting the electrical boxes with suitably insulated electrical wires, after which the electrical receptacle or switch associated with the box is wired thereto by exposing the ends of the wires in the box and attaching them to suitable terminals on the electrical receptacle or switch, after which the switch or receptacle is inserted into the box and covered over with an electrical plate to hide the electrical connections made thereto and protect the same from contact by an individual who would undoubtedly receive an electrical shock on contacting such electrical conductors.

This wiring system poses the disadvantage that should it be necessary to repair or replace an electrical switch, which is not unusual due to the wear and tear of a switch in a position exposing it to constant usage, such as in controlling a frequently used light and the like, it is required that the switch plate be removed, thus exposing the electrical conductors on a conventional type of electrical switch, after which the switch be unscrewed from the electrical box and pulled out of the box to expose the electrical wiring terminals thereon, this further increasing the danger of possible shock from the electrical conductors. The wires must then be removed from the screw terminals, a new switch wired to such wires, the new switch then inserted and screwed into the electrical box, after which the electrical switch plate must then be properly placed in position. This is a time consuming and possibly hazardous and dangerous job as, should the electrical conductors be weakened due to age or flexing and inadvertently break off of the screw terminal when the new switch is inserted into the electrical box, there is a possibility of an electrical hazard existing upon the energization of the circuit to the box as such broken conductor may be touching the box or other metallic surface which might present a serious shock hazard to individuals using the electrical switch.

Further, such presently used wiring system is time consuming for repairing and replacing the electrical switches, this thus involving a costly procedure when such must be performed by a skilled electrician or the like.

Still further, such presently used wiring systems provide a degree of inconvenience as the electrical circuit energizing the switch to be repaired or replaced must normally be de-energized before and during the work being performed thereon, this de-energization of such electrical circuit also de-energizing any other lights, appliances and the like which may also be electrically powered from the same circuit.

SUMMARY OF THE INVENTION

The present invention remedies and overcomes the deficiencies and disadvantages of presently available electrical wiring systems for electrical switches and used in a home, business, industry and other locations by providing a novel permanently wired electrical receptacle adapted to be permanently mounted in a conventional type of electrical box mounted in the wall or other suitable supporting surface and having an electrical switch module with a plurality of plugs projecting from the back surface thereof adapted to be oriented relative to the receptacle and then have the plugs engage the sockets of the receptacle upon pressing of the electrical switch into the receptacle to thus energize such electrical switch. In this manner it is not required to remove any wires from any switch terminals, handle any electrical wires, or the like. It is thus possible to replace an electrical switch in a rapid and expedient manner without having to de-energize the electrical circuit, there being no bare electrical conductors or the like exposed during the replacement of the switch such that there is no electrical hazard or danger to an individual working about the electrical box.

It is a feature of the present invention to provide a permanently wired receptacle mounted in an electrical box and adapted to receive in a plug-in manner therein an electrical switch, the same being received in a readily insertable and replaceable manner without requiring any special tools, skill, or expertise, and without exposing the installer to any risk of electrical shock hazard or danger therefrom, and without requiring the electrical circuit to be de-energized such as by disconnecting a fuse or the like.

A further feature of the present invention provides an electric plug-in module type switch which is relatively simple in its construction and which therefore may be readily manufactured at a cost competitive to the cost of conventionally manufactured electrical switches, and yet provide a distinct advantage thereover as to safety, ease of installation, ready repair and replacement, and the like.

The provision of an electrical receptacle and associated plug-in module type electrical switch such as briefly outlined above, and possessing the stated features and advantages, constitutes the principal features and advantages of the present invention. The provision of a receptacle and associated electric plug-in module electrical switch which is rugged and durable and which therefore may be guaranteed by the manufacturer to withstand the intended usage; one which is aesthetically pleasing and refined in appearance; one which may, in its entirety, be manufactured and installed as part of the original wiring equipment in a home, business, industry or the like, or which may be added at a later date to the home as a change in the electrical wiring system; and one which, otherwise, is well adapted to perform the services required of it, are further desirable features and advantages which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is an exploded perspective view of a conventional electrical box, a receptacle adapted to be mounted therein, and an electric switch module oriented in position to be plugged into the receptacle, this being in accordance with the present invention;

FIG. 2 is a side elevational view of the electric box installed in a wall with the receptacle and switch module mounted therein;

FIG. 3 is a back perspective view of a switch module constructed in accordance with the principles of the present invention;

FIG. 4 is a front perspective view of an electrical box having a modified four socket receptacle mounted therein;

FIG. 5 is a back perspective view of a modified switch module adapted for use with the receptacle of FIG. 4 and having four plugs projecting rearwardly thereof; and FIG. 6 is a top plan view of the four-socket receptacle of FIG. 4.

DESCRIPTION OF THE PREFERRED EMBODIMENTS

Referring now to the drawings in detail and in particular to FIGS. 1 to 3 inclusive, there is illustrated a preferred form of an electrical receptacle and associated electric plug-in module electric switch constructed in accordance with the principles of the present invention and which is comprised generally of two component parts, namely an electrical receptacle 11 and a plug-in module in the form of an electrical toggle type switch 12, the switch adapted to plug into the receptacle which in turn is adapted to be permanently mounted in a conventional type electrical box 14.

The electrical wiring box 14 is in the form of a conventional hollow box shape having a bottom surface 21, a pair of opposed top and bottom end walls 23 and 22 extending outwardly from the opposed end edges of the bottom surface and substantially normal to the plane thereof, each of the walls 22 and 23 having at their topmost edge thereof a winged portion 26 projecting outwardly therefrom substantially parallel to the plane of the bottom surface 21, and a pair of opposed side wall members 24 and 25 each extending outwardly from the side edges of the bottom surface. Defined between the interior of wall surfaces 21–25 is a rectangular compartment 30 adapted to receive therein the electrical receptacle 11. The electrical box 14 is illustrated mounted in an opening 31 of a vertical wall 32, the mounting therein being in the well known conventional manner through the use of screws, bolts and the like with the winged portions 26 engaging the exterior surface of such vertical wall surface such that the base of the rectangular compartment 30 is parallel to the vertical wall surface.

The receptacle 11 is formed of a body member 40 manufactured of electrical insulating material, such as bakelite or the like, and includes a front surface 41, a back surface 42, top and bottom surfaces 43 and 44, and opposed side surfaces 45 and 46. Front surface 41 includes a pair of longitudinally aligned elongated sockets 47 which are internally connected in a conventional manner by suitable electrical wires, contacts and the like to electrical terminal screws 48 disposed along side wall 45 and adapted to receive thereon the ends of suitable electrical wires 49 which pass through an opening 50 in box 14, the wires 49 being contained in a suitable conduit 51 such as in the form of DX, Greenfield Cable or the like, or such flexible conduit being in the form of a rigid conduit having suitable electrical wires extending therethrough. Extending outwardly from top and bottom surfaces 43 and 44 are flanges 51 each hanving an opening 42 disposed approximately centrally thereof, the use thereof which will be later described. Mounted to the back surface 42 is a base member 53 of a U-shaped bracket 54 having opposed leg members 55 which extend parallel and spaced from opposed top and bottom surfaces 43 and 44, the legs 55 projecting forwardly of the front surface 41 and terminating in outwardly extending flange portions 56 each having an opening 57 extending therethrough, the spacing between openings 57 corresponding to the spacing between openings 58 in flanges 26 of box 14 such that the receptacle 11 may be oriented relative to the box 14 and mounted thereinto by means of threaded screws 59 passing through openings 57 and being threadedly received in the axially aligned openings 58, this securing receptacle 11 inwardly of box compartment 30 with receptacle back surface 42 adjacent back box surface 21.

The plug-in module electrical toggle switch 12 is of a box-like rectangular configuration having a front surface 61, a back surface 62, opposed top and bottom surfaces 63 and 64, and opposed side surfaces 65 and 66. A slat 67 is provided in front surface 61 and has a toggle actuating member 68 projecting outwardly therefrom adapted for manual manipulation thereof in a conventional back-and-forth movement. The back surface 62 has a pair of rectangularly shaped electrical conducting plugs 69 in substantial vertical alignment and projecting outwardly therefrom, the size and configuration of each of the plugs 69 as well as the spacing therebetween corresponding to the size and configuration of each of the slots forming sockets 47 and the spacing therebetween such that the plugs may be readily inserted into and removed from the sockets. Projecting outwardly from each of the top and bottom surfaces 63 to 64 is a flange 71 having an opening 72 disposed centrally thereof, the opening 72 adapted to be axially aligned with associated openings 52 in receptacle 11 when plugs 69 are engaged in sockets 47, with there being provided a pair of screws 73 each associated with a pair of the axially aligned openings and adapted to be axially inserted through associated openings 72 in a manner to be threadedly received in associated opening 52, this retaining the switch 12 mounted in receptacle 11. It is to be understood that operation of the actuating member 68 effects, through internal electrical connetions, the electrical connection and disconnection between the plugs 69, this depending upon the position of the member 68.

In operation, receptacle 11 is wired to electrical wires 49 and then mounted in box 14 by screws 59, after which switch 12 is readily plugged into sockets 47 and then retained in position by screws 73, the plugs 69 coming into electrical engagement with sockets 47 to thus automatically connect the circuit of the switch into the electrical wiring system. Any repair or replacement of the switch is readily accomplished by removing screws 73 and then unplugging the switch from the receptacle 11 and inserting a new switch into the receptacle and replacing the screws 73, this being accomplished with a minimum of time and effort, with no special tools or expertise being required, and with no danger of exposure of electrical energy carrying parts to be contacted by the individual since the receptacle 11 remains secured in the box 14 without having to make any movement of the wires or the like, this substantially eliminating any danger of electrical hazards or electrical shock.

Referring now to FIGS. 4 to 6 inclusive of the drawings, there is illustrated a modified form of the invention wherein the basics are substantially identical to the previously described embodiment of FIGS. 1–3 except that four slots 47' are provided in face surface 41', these cooperating with four similarly sized and oriented plugs 69' projecting outwardly of the back surface 62' of toggle switch module 12' and adapted to electrically engage in sockets 47' for electrically energizing the switch module. Due to the similarity between parts of the two forms of the invention, and in order to avoid needless repetition of description, similar reference numerals but having a single prime mark applied thereafter have been used to identify the corresponding parts as between the disclosures of FIGS. 1–3 and FIGS. 4–6.

For using the receptacle 11' with an electrical switch 12' which may be of three-way or four-way switch configuration, there is provided in the top surface 63' a pair of members 81 and 82 which may be in the form of screws, rivets and the like, and which are interconnected electrically by a breakable jumper 83, the member 81 being electrically connected to the socket 47' disposed immediately therebeneath with the member 82 being electrically connected to the socket 47' being disposed immediately therebeneath such that the jumper 83 electrically interconnects the top pair of sockets 47', with breaking of the jumper 83 serving to electrically separate the top pair of sockets 47'. In this way a conventional three-way switch configuration may be utilized for the electrical switch module 12' with the jumper 83 left interconnecting the top pair of sockets 47', with the receptacle 11' being utilized for a four-way switch configuration of switch 12' by breaking the jumper 83 to separate the top pair of sockets 47'.

It is to be understoood that the electrical plugs on the back of the switch modules 12 and 12' are each electrically connected interiorly of the module to respective electrical contacts in the switch in a conventional manner so as to electrically energize the same for operation once plugged into the associated receptacle 11 or 11'.

It is to be understood that the form of this invention herewith shown and described is to be taken as preferred examples of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claim.

Having thus described the invention, what is claimed is:

1. An electrical wiring system intended for use with a conventional type of electrical wiring box adapted to be mounted in a vertical surface, such as a wall and the like, and having a compartment defined interiorly thereof and opening out of the front thereof, the system comprising, in combination:
   an electrical receptacle device adapted to be mounted interiorly of said box compartment;
   said receptacle having a flat vertical front surface, a flat vertical back surface, opposed top and bottom end surfaces, and opposed parallel side wall surfaces;
   a pair of spaced apart vertically extending flanges each associated with a top and bottom edge of said receptacle and projecting vertically outwardly therefrom and extending transversely thereacross;
   an opening disposed centrally of each of said receptacle flanges and extending therethrough;
   a bracket of a U-shaped configuration adapted to mount said receptacle in said box compartment, said bracket having a bright portion defining a base member, a pair of parallel outwardly extending leg members, and a pair of spaced apart oppositely directed flange members formed integrally with the free ends of the leg members and projecting vertically therefrom;
   said bracket base member being mounted along the vertical central axis of said receptacle back surface and affixed thereto;
   said bracket leg members each projecting forwardly from said base member to a position disposed forwardly of said receptacle device front surface and spaced vertically apart a distance greater than the exterior edges of said flange members of said receptacle device;
   said terminal flange members associated with each leg member having an opening disposed centrally thereof and extending therethrough, each of the openings adapted to be placed in axial alignment with associated mounting openings in said electrical box;
   a pair of screws having threaded shanks, each screw associated with one of said leg member flange members adapted to pass through said opening associated therewith and be threadedly received in said associated mounting openings of said electrical box to secure said receptacle device to said electrical box inwardly of said box compartment;
   four electrical sockets disposed in said front surface of said receptacle device and projecting thereinto, said sockets each being of an identical elongated rectangular configuration disposed in two vertical rows of two sockets each with the pair of sockets of each row being disposed in transverse alignment with the pair of sockets of the other row;
   a pair of independent terminal connectors mounted on the top surface of said receptacle device, each terminal connector electrically connected to the topmost adjacent ones of said sockets to be in electrical communication therewith;
   a second pair of terminal connectors mounted on said bottom surface of said receptacle device with each independently connected to one of the adjacentmost sockets to be in electrical communication therewith;
   a first breakable jumper means electrically interconnecting said first pair of terminal connectors and disposed exteriorly of said receptacle device and adapted to be manually broken in a manner to effect the electrical separation of said terminal connectors and said associated sockets;

a second breakable jumper means electrically interconnecting said second pair of terminal connectors and disposed exteriorly of said bottom surface of said receptacle device and adapted to be manually broken in a manner to effect the electrical separation of said terminal connectors and said associated sockets;

an electrical switch device adapted to be mounted on said receptacle device;

said electrical switch device consisting of a front surface, a vertical flat back surface, opposed vertical side wall surfaces, and opposed top and bottom horizontal surfaces;

a toggle switch actuating means disposed inwardly of said switch device and having its handle portion projecting outwardly of said switch device face surface for manual actuation thereof exteriorly of said switch device;

a pair of parallel spaced apart oppositely projecting flange members, each flange member associated with the top and bottom surfaces of said switch device and projecting outwardly therefrom in opposite directions;

an aperture disposed centrally of each of said switch device flange members and extending therethrough;

said switch device flange members adapted to overlie in a parallel manner said receptacle device flange members when said switch device is mounted on said receptacle device with said apertures of said switch device flange members disposed in axial alignment with associated ones of said apertures of said receptacle device flange members;

a pair of screws each having a threaded shank, each of said screws associated with one set of aligned flange member apertures and adapted to be passed through the central opening of said switch device flange member opening and be threadedly received in said aligned opening of said receptacle device flange member to removably retain said switch device mounted on said receptacle device;

four independent electrical conducting plug members of an identical flat elongated rectangular configuration affixed to said back surface of said switch device and projecting outwardly therefrom in spaced apart relationship to each other, said plugs being of a size, configuration and spacing corresponding to the size, configuration and spacing of said sockets in said receptacle device;

said plugs adapted to be oriented relative to said receptacle sockets with said plugs being engaged in said sockets and making electrical contact therewith when said switch device is mounted on said receptacle device with said plug members engaged in said socket;

said plug members being electrically connected inwardly of said switch device to switching mechanisms for making and breaking electrical contact between said plug members;

whereby a single switch device may be used both as a conventional single switch, a three-way switch, and a four-way switch merely by selective wiring of the terminal connectors of the receptacle device and the manual breaking away of said first and second jumper means depending upon the intended usage of the switch device in the electrical circuit to be controlled thereby.

* * * * *